3,402,123
METHOD FOR SEPARATING LIGHT HYDROCARBON COMPONENTS
Angelo C. Coste, Chicago, Ill., assignor to Universal Oil Products Company, Des Plaines, Ill., a corporation of Delaware
Filed Sept. 15, 1966, Ser. No. 579,614
1 Claim. (Cl. 208—105)

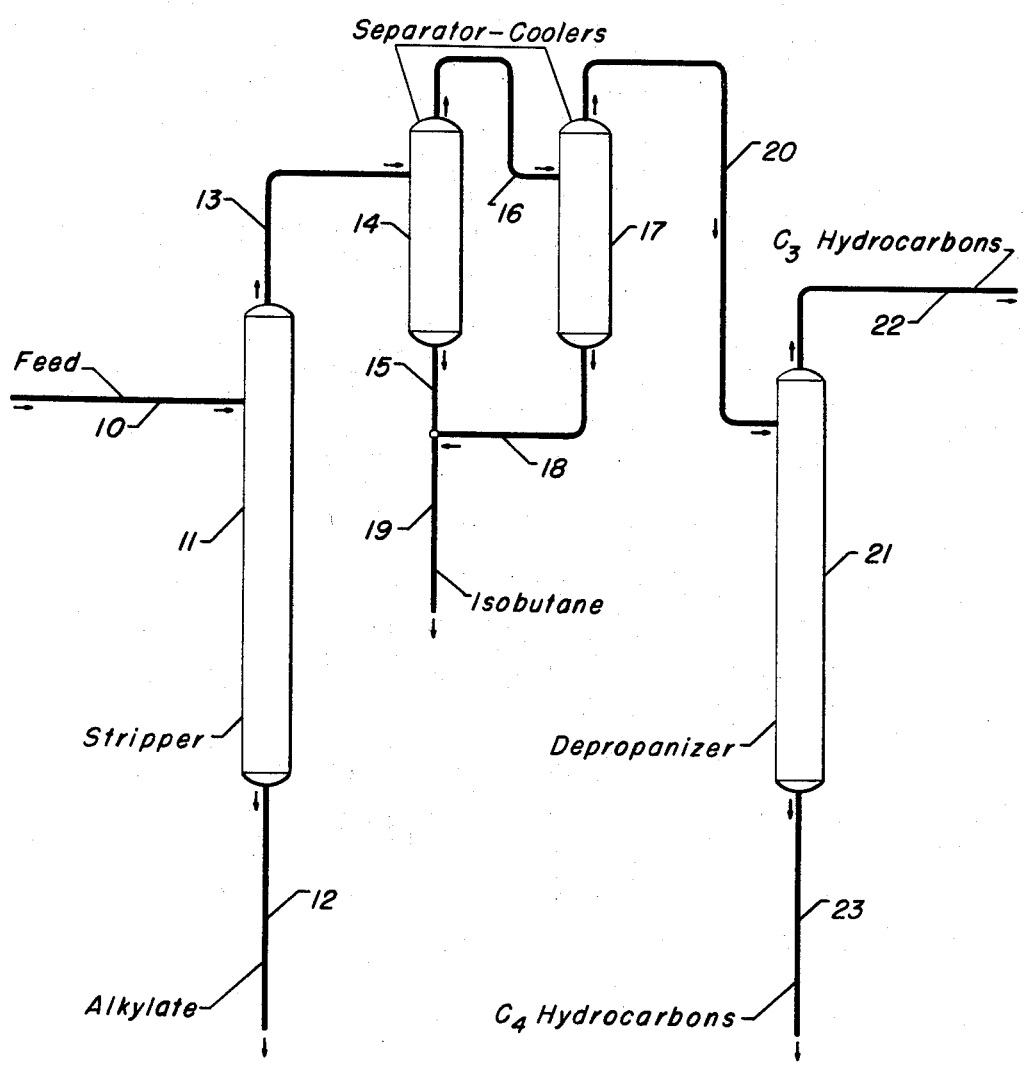

ABSTRACT OF THE DISCLOSURE

Method for separating the effluent from a $C_4$ alkylation reaction zone into selected fractions including motor fuel components and light hydrocarbons using fractionation means and a partial condensation technique.

---

This invention relates to a fractionation scheme. It also relates to a method for separating light hydrocarbon components. It particularly relates to a method for separating normally gaseous hydrocarbons from the effluent of a catalytic alkylation process. The invention specifically relates to a method for enriching the feed to the depropanizing column operating in conjunction with an isobutane stripping column.

It is well known in the prior art that catalytic alkylation using a catalyst such as hydrofluoric acid has become an important chemical tool for preparing alkylated hydrocarbons and derivatives thereof. The commercial and industrial demand for these products is exemplified by the demand for isoparaffins and alkyl-substituted benzenes of gasoline boiling range and the demand for alkyl-substituted aromatic hydrocarbons suitable for conversion to surfactants, e.g. detergents, wetting agents, etc. The prior art processes of alkylation generally are effected by contacting an isoparaffin hydrocarbon feedstock with an olefin hydrocarbon in the presence of a catalyst, such as hydrofluoric acid, in a typical reaction vessel for conducting chemical reactions.

The catalytic alkylation process to which the present invention is applicable consists of a process in which a mixture of hydrocarbon containing isoparaffins, such as isobutane, isopentane, and the like, and olefins, such as propylenes, butenes, isobutenes, amylenes, and the like, are mixed intimately in the presence of a strong acid catalyst, such as hydrofluoric acid or sulfuric acid, at generally room temperatures or lower for sufficient time to complete the reaction. The effluent from the reaction zone contains isoparaffin hydrocarbons of higher molecular weight than the isoparaffin in the original mixture. Isobutane has been used almost exclusively because of its reactivity and availability to produce the high quality alkylate product. In similar manner, among the olefins, butenes have been used almost exclusively. Propylene and the pentenes and even higher boiling olefinic feedstocks can be used according to their availability.

However, as is typical in most commercial chemical plants, the reaction between the isobutane and the butylene is not complete. Additionally, the presence of a large excess quantity of isobutane (10:1 i-$C_4$/$C_4$= molar ratio) in the reaction zone significantly enhances the quality of the alkylate produced. Accordingly, there is a large excess of the isoparaffin hydrocarbon remaining in the effluent from the reaction zone. Therefore, it is desirable to recover and reuse the isoparaffin reactant in as high yield as possible and in as simple and economical manner as possible.

In like manner, propane which passes through the alkylation reaction unchanged and the small amount of propane that is produced from the reaction, must also be removed from the alkylate product. The separation of the propane from isobutane is conventionally done in a depropanizing column since the deisobutanizer tower can only separate the isobutane from the n-butane. Thus, the depropanizer column is normally of considearble size so that propane can be recovered in substantially pure form and $C_4$ hydrocarbons may be rejected from the bottom of the tower suitable for reuse in the reaction. Therefore, it is desirable to separate the propane or $C_3$ hydrocarbons from the $C_4$ hydrocarbons in as economical manner as possible.

In practice, there have been numerous process schemes advanced by the prior art for accomplishing the alkylation reaction, recovery of the isoparaffin hydrocarbon, and recovery of the $C_3$ hydrocarbons. Generally, the prior art has taken the hydrocarbon portion of the reaction zone effluent into what is commonly called a deisobutanizer tower wherein an isobutane stream is recovered as an overhead fraction and the desired alkylate product is removed from the bottom of the tower. The difficulty with this practice is that the feed streams from normal refinery operations to an alkylation plant contain not only the desired reactants, isobutane and butylene, but also contain $C_2$ to $C_5$ hydrocarbons in various amounts. Therefore, the overhead stream from the deisobutanizer tower in a conventional alkylation plant not only contains isobutane but also contains at least the $C_3$ hydrocarbons which were present in the feed. In order to make an economical separation of the $C_3$ and $C_4$ hydrocarbons, the deisobutanizer tower, of necessity, must be of considerable height and also must contain extensive condensing and receiving equipment for the overhead streams. Typically, the prior art deisobutanizer tower is operated such that the desired isobutane fraction is condensed and a vapor fraction containing the $C_3$ hydrocarbons is removed from the overhead receiver for further processing in a depropanizer tower.

It is an object of the present invention to provide a fractionation scheme.

It is another object of this invention to provide an improved alkylation process for the recovery of the isoparaffin reactant for reuse in the system and the recovery of the $C_3$ hydrocarbons.

It is a specific object of this invention to provide a fractionation scheme for the preparation of the feedstock to a depropanizer column operating in conjunction with an isobutane stripping tower in a more facile and economical manner than has heretofore been possible.

As was previously noted, the feedstock to the conventional alkylation reaction preferably consists of isobutane and butylene. However, as will be more fully developed herein, the present invention encompasses a feed mixture containing $C_3$ and $C_4$ olefins as well as the $C_2$ to $C_5$ paraffins, but which will predominate in the $C_4$ hydrocarbons. In similar manner, the invention contemplates the use of any suitable catalyst material in addition to hydrofluoric acid, such as sulfuric acid, mixtures of sulfuric and phosphoric acid, and certain complexes of aluminum chloride and sulfuric acid, etc.

According to this invention, there is provided a method for separating normally gaseous hydrocarbons from the effluent of a $C_4$ alkylation reaction zone which comprises the steps of: (a) passing the hydrocarbon effluent from said reaction zone into first fractionation means under conditions sufficient to produce a first vapor fraction comprising $C_3$ and $C_4$ hydrocarbons and a first liquid fraction comprising $C_4^+$ hydrocarbons; (b) partially condensing said first vapor fraction to produce a second vapor fraction enriched in $C_3$ hydrocarbons and a second liquid fraction enriched in $C_4$ hydrocarbons; (c) partially condensing said second vapor fraction to produce a third vapor fraction comprising $C_3$ hydrocarbons and a third liquid fraction containing C₄ hydrocarbons; (d) condensing said third vapor fraction; (e) passing the total effluent from the third vapor fraction condensing means into second fractionation means under conditions sufficient to produce a substantially pure C₃ product stream and a C₄ hydrocarbon stream; and (f) returning C₄ hydrocarbons to said reaction zone.

Another embodiment of the present invention includes the comingling of said second liquid fraction and said third liquid fraction for return to said reaction zone.

Still another embodiment of this invention includes partially condensing the second vapor fraction from 5% to 50% by volume of the first vapor fraction and the partial condensation of the third vapor fraction from 10% to 50% by volume of the second vapor fraction.

The objects and advantages of this invention will be more clearly understood from the description presented hereinbelow and from the appended drawing which is a diagrammatic representation of apparatus for practicing the invention.

The description of the present invention will be limited to the processing scheme for handling the effluent from a conventional C₄ alkylation reaction zone, although the scope of the invention is not necessarily to be limited thereto. The effluent is prepared by means known to those skilled in the art and generally comprises the steps of comingling an olefin-containing feedstock with an isoparaffin-containing feedstock and passing the mixture into a conventional alkylation reactor vessel. An isobutane-enriched paraffinic hydrocarbon stream is also added to the reaction zone in order that the isoparaffin-to-olefin ratio in the presence of the catalyst is at the proper level. Means for removing the heat of reaction from the reactor must be provided and the contact time in the reactor is maintained for periods sufficient to intimately mix and contact the feed mixture with the catalyst so that the alkylation reaction can occur. The total effluent from the reaction zone is generally removed and passed into a separation means whereby the acid is separated from the hydrocarbon phase generally by settling. The acid is returned to the process in admixture with fresh acid as needed and the hydrocarbon phase is further processed in accordance with this invention.

Referring now to the drawing, the effluent from the reaction, substantially free from a major portion of the, for example, hydrogen fluoride catalyst, is passed into deisobutanizer stripper column 11 via line 10. For example purposes, the hydrocarbon effluent fraction in line 10, passing into stripper 11, has the following composition based on mols per hour: 1250 mols of propane, 5131 mols of isobutane, 993 mols of butane, 107 mols of isopentane, and 1 mol of pentane. The remaining portion of the feed stream in line 10 comprises approximately 765 mols per hour of C₅⁺ hydrocarbons, commonly called "alkylate," which is removed from stripper column 11 via line 12 for blending into motor fuel or for other uses known to those skilled in the art. The alkylate may contain sufficient C₄ hydrocarbons (n-butane) for proper vapor pressure control, although for convenience it will be referred to herein as C₅⁺ hydrocarbon material.

Typically, the isostripper 7 is a fractionation column 7 feet in diameter containing 50 trays spaced 24 inches apart. It operates at a pressure of less than 200 p.s.i.g., e.g., about 150 p.s.i.g., with a top temperature of about 155° F. and a bottoms temperature of about 350° F. It operates without external reflux. Preferably, isostripper 11 is fed near the middle of the vessel with a saturate butane stream not shown. This saturate stream supplies isobutane to supplement that contained in the olefin-containing feed. Excess n-butane is withdrawn further down the column as a sidecut (not shown) and leaves the system as a separate product.

Within isostripper 11 a substantial separation is made between the lower boiling isobutane, higher boiling n-butane, and the reaction products. A combination of iso- butane flashing and alkylate stripping is accomplished in the isostripper. As set forth hereinabove, the column has no external reflux and operates as a true stripper column. It is no longer necessary to employ extremely costly reflux ratios to provide isobutane of high purity as recycle to the reactor. In addition, the n-butane present in the olefin feed to the alkylation unit, plus the n-butane which is usually found in the outside isobutane stream, plus the small amount of n-butane produced in the alkylation process itself, all must leave the system. Thus, if this n-butane were allowed to accumulate in the alkylate, its vapor pressure would be extremely high and no control of the vapor pressure of the product alkylate could be exercised without the use of a subsequent stabilizing step.

In the design of modern alkylation units, vapor pressure control is achieved by withdrawing a vapor sidecut at the proper point (not shown) on the isostripper as hereinbefore set forth. The position of the withdrawal point is usually chosen so that the n-butane sidecut will contain less than about 5% isobutane and less than about 4% pentanes, and still allow for some control of the vapor pressure of the product alkylate.

According to the present invention, the isostripper overhead system operates to produce an overhead product having a composition in mol percent of: propane 18.0%, isobutane 71.5%, n-butane 8.6%, and pentanes 1.9%. This stream is removed from stripper column 11 via line 13 and passed into first separation means 14.

Typically, the conditions maintained in separator 14 are sufficient to produce a first vapor fraction in line 16 comprising C₃ and C₄ hydrocarbons and a first liquid fraction in line 15 containing isobutane. The operating conditions in separator 14 include, typically, a temperature of approximately 140° F. and a pressure of approximately 140 p.s.i.g. Under these typical conditions approximately 23% by volume of the feed mixture remains a vapor and is removed via line 16. However, separator 14 may also be operated under a range of temperatures from 90° F. to 160° F., and pressures from 100 p.s.i.g. to 200 p.s.i.g. In the practice of this invention, the amount vaporized in line 16 may be from 5% to 50% by volume of the material in line 13.

The first vapor fraction in line 16 has the following illustrative composition: 388 mols per hour propane, 996 mols per hour of isobutane, 158 mols per hour of butane, and 11 mols per hour of isopentane. This material is passed via line 16 into second separation means 17 wherein this first vapor fraction is only partially condensed. A second vapor fraction is removed via line 20 and contains the major proportion of C₃ hydrocarbons for further processing in depropanizer tower 21. A second liquid fraction is removed from separator 17 via line 18 and, preferably, commingled with the material in line 15 to produce an isobutane-enriched stream in line 19 for reuse in the alkylation reactor, if desired.

The conditions in separator 17 include a typical temperature of 134° F., a typical pressure of 135 p.s.i.g., wherein approximately 48% by volume of the material in line 16 remains a vapor and is removed via line 20 as hereinabove specified. The broad range of operating conditions for separator 17 applicable to the present invention include a temperature from 90° F. to 140° F. and pressures from 125 p.s.i.g. to 200 p.s.i.g., whereby from 10% to 50% by volume of the material in line 16 remains in a vapor phase and is removed through line 20.

The composition of the C₃ hydrocarbons in line 20 for this example, include 238 mols per hour of propane, 439 mols per hour of isobutane, and 63 mols per hour of butane. In similar manner, the composition of the liquid in line 18, for example purposes, includes 150 mols per hour propane, 557 mols per hour isobutane, 95 mols per hour of butane, and 11 mols per hour of isopentane.

At this point it should be noted that in the practice of this invention the removal of the C₃ hydrocarbons and a portion of the C₄ hydrocarbons by the unique two-stage partial condensing system previously described, allows the equipment for the overhead of depropanizer column 21 discussed hereinbelow to be reduced in size and expense.

The material in line 20 is passed into depropanizer column 21 wherein, for example, 74 mols per hour of substantially pure $C_3$ hydrocarbons are removed from the system via line 22. The remaining portion of the feed in line 20 is removed from column 21 via line 23 and comprises, for example, 502 mols per hour of essentially $C_4$ hydrocarbons which may be removed from the process or may be further mingled with the $C_4$ hydrocarbons in line 19 for reuse in the reaction zone.

Depropanizer column 21 typically is a vessel 4 feet in diameter containing 36 trays or perforated plates spaced 24 inches apart. The depropanizer column operates at a pressure of about 275 p.s.i.g., with a top temperature of about 125° F. and a bottoms temperature of about 215° F. Since substantial quantities of $C_4$ hydrocarbons have been removed, the utility cost, e.g., heat requirements for reboiling, are significantly less than would be required for conventional depropanizer towers operating in similar service. In some cases, practice of the invention may reduce the size of the depropanizer tower.

Again with reference to the attached drawing, the operation of the inventive partial condensation method is illustrated by analyzing the compositions in the pertinent vapor streams. For example, the following table shows typical results:

| Line No. | 13 | 16 | 20 |
|---|---|---|---|
| Composition (mol percent): | | | |
| $C_2$ | 0.2 | 0.4 | 0.1 |
| $C_3$ | 17.8 | 26.5 | 33.8 |
| i-$C_4$ | 71.5 | 65.8 | 60.3 |
| n-$C_4$ | 8.6 | 6.4 | 5.3 |
| i-$C_5$ | 1.9 | 0.9 | 0.5 |
| | 100.0 | 100.0 | 100.0 |

By suitable calculation, it can be seen from the line 13 data that the total condensation of this stream would only remove 10% to 15% of the propane without using refrigeration in the condensing means. Again, by calculation, using the inventive method of partial condensation vapor enrichment of the propane stream can be achieved at about 50% (mol) propane, typically 34%, without refrigeration.

Conventional conversion conditions of temperature, pressure, isoparaffin-olefin ratio, and hydrogen fluoride-hydrocarbon ratio can be employed advantageously in the reaction zone contemplated herein. For example, the alkylation of isobutane with butylenes can be carried out at temperatures between 0° F. and 150° F., preferably between 80° F. and 110° F., at pressures sufficiently high to keep the hydrocarbon and catalyst in liquid phase, and at isobutane-butylene ratios between 2:1 and 20:1, preferably between 10:1 and 15:1. Ratios of isobutane to butylene of at least 2:1 are essential since lower ratios tend to cause polymerization of the butylenes with the resulting decrease in yield of the desired alkylate product. The ratio of catalyst to hydrocarbon charge can be varied considerably. For example, a ratio of 1:1 to 10:1 can be used, preferably at least 2:1 is used. The acid catalyst charged through reactors can be substantially anhydrous and can have a titratable acidity as low as 65% by weight, but preferably is maintained between 85% and 95% acidity.

When operating a hydrogen fluoride alkylation unit in the manner hereinabove described utilizing the process of the present invention, an alkylate product having an end point below 400° F. and a leaded octane (at 3 cc. TEL/gallon of alkylate) of at least 105, is attained with a hydrogen fluoride catalyst consumption of less than 0.2 pound of catalyst per barrel of alkylate produced. Additionally, significant economy of operation is achieved with the process schemes taught by the prior art.

The $C_3$ hydrocarbon is removed and recovered from the process according to this invention in substantially pure form and may be used conveniently as household fuel or LPG gas. The description of the present invention has disclosed a method for separating normally gaseous hydrocarbons from the effluent of a $C_4$ alkylation reaction zone. Inherently involved in the processing scheme are conventional means for removing residual acid catalyst from the various streams as they are processed through the fractionation train. These conventional acid removal schemes have not been disclosed or discussed, but are well known to those skilled in the art. Thus, the present invention provides a novel two-stage process for preparing feed to depropanizer columns where substantially pure $C_3$ hydrocarbons are recovered from the system and $C_4$ hydrocarbons are also recovered for reuse in the system if desired.

The invention claimed:
1. Method for separating normally gaseous hydrocarbons from the effluent of a $C_4$ alkylation reaction zone which consists essentially of:
  (a) passing the hydrocarbon effluent from said reaction zone into a first fractionation means maintained under fractionation conditions;
  (b) withdrawing from said first fractionation means an overhead vapor fraction comprising isobutane and propane, a side-cut fraction comprising n-butane, and a product fraction comprising alkylate;
  (c) partially condensing said overhead fraction at a temperature from 90° F. to 160° F. to produce a first vapor fraction comprising from 5% to 50% by volume of said overhead fraction and a first liquid fraction comprising isobutane;
  (d) partially condensing said first vapor fraction at a temperature from 90° F. to 140° F. to produce a second vapor fraction comprising from 10% to 50% by volume of said first vapor fraction and a second liquid fraction comprising isobutane;
  (e) condensing said second vapor fraction;
  (f) passing the total effluent from the second vapor fraction condensing means into second fractionation means under conditions sufficient to produce a substantially pure propane stream and a bottoms fraction comprising isobutane;
  (g) commingling said first liquid fraction, said second liquid fraction, and said bottoms fraction to produce a concentrate of isobutane; and,
  (h) returning said concentrate directly to said reaction zone.

References Cited

UNITED STATES PATENTS

| 2,049,027 | 7/1936 | Schonberg et al. | 208—351 |
| 3,162,694 | 12/1964 | Beavon | 260—683.62 |
| 2,382,067 | 8/1945 | Kniel | 208—105 |

OTHER REFERENCES

Petroleum Refiner, vol. 28, No. 9, September 1949, page 233.

DELBERT E. GANTZ, *Primary Examiner.*

H. LEVINE, *Assistant Examiner.*